United States Patent [19]
Kato et al.

[11] 3,973,238
[45] Aug. 3, 1976

[54] FLASHER APPARATUS FOR VEHICLE

[75] Inventors: Minoru Kato, Ichinomiya; Yasuhiko Sakurai, Kariya, both of Japan

[73] Assignee: Nippondenso Co., Ltd., Aichi, Japan

[22] Filed: Oct. 1, 1974

[21] Appl. No.: 511,481

[30] Foreign Application Priority Data
Oct. 11, 1973 Japan.............................. 48-114095

[52] U.S. Cl................................ 340/81 R; 340/251
[51] Int. Cl.²........................................... B60Q 1/46
[58] Field of Search.......... 340/81 R, 73, 251, 52 R, 340/80

[56] References Cited
UNITED STATES PATENTS

| | | |
|---|---|---|
| 3,263,119 | 7/1966 | Scholl .............................. 340/81 R |
| 3,329,868 | 7/1967 | Domann et al. ................... 340/81 R |
| 3,747,062 | 7/1973 | Williams ............................ 340/251 |
| 3,858,177 | 12/1974 | Kugelmann et al................... 340/73 |

*Primary Examiner*—John W. Caldwell
*Assistant Examiner*—Donnie L. Crosland
*Attorney, Agent, or Firm*—Cushman, Darby & Cushman

[57] ABSTRACT

A flasher apparatus for a vehicle which changes the flashing cycle of the lamps when one or more lamps burn out for warning a driver of the malfunction, the flashing cycle being determined by the discharging time of a capacitor which is controlled by a voltage supplied thereto, the vltage being higher than usual, in the event of malfunction.

7 Claims, 3 Drawing Figures

LAMPS

FLASHER APPARATUS FOR VEHICLE

BACKGROUND OF THE INVENTION

The present invention relates to a flasher apparatus to be used as a traffic indicator installed in a vehicle and a method for performing flashing operation of the same. Most of the conventional flasher apparatus for vehicles are constructed to make all their lamps keep on one condition, that is, either an "on" or an "off" condition when a lamp burns out. In the conventional flasher, however, when some of the lamps malfunction, all of normal traffic indicator lamps and traffic indicator pilot lamps suddenly change their operating patterns from a flashing state to a non-flashing state. This sudden change of operating pattern to a non-flashing state is not apt to attract the attention of a driver or the people outside the vehicle to the malfunction. Therefore, the conventional flasher is disadvantageous from the standpoint of safe driving.

SUMMARY OF THE INVENTION

To overcome the foregoing disadvantage, it is an object of the present invention to provide a flasher apparatus for a vehicle which shortens the flashing cycle time instead of shifting to a non-flashing condition, when one of the lamps burns out, for letting people notice the existence of the same, thereby being able to avoid the danger of driving the vehicle with non-operating flashing lamps.

It is another object of the present invention to provide a flasher apparatus which also can be used as a emergency indicating flasher apparatus, taking all of the lamps into flashing operation to indicate every possible emergency.

It is further object of the present invention to provide a electrical circuit for a flasher apparatus for a vehicle which is simple and inexpensive in production.

It is further object of the present invention to provide a new method for performing a flashing operation in letting people notice a direction of driving vehicle or emergency.

DESCRIPTION OF THE PREFERRED EMBODIMENTS

Figure 1:
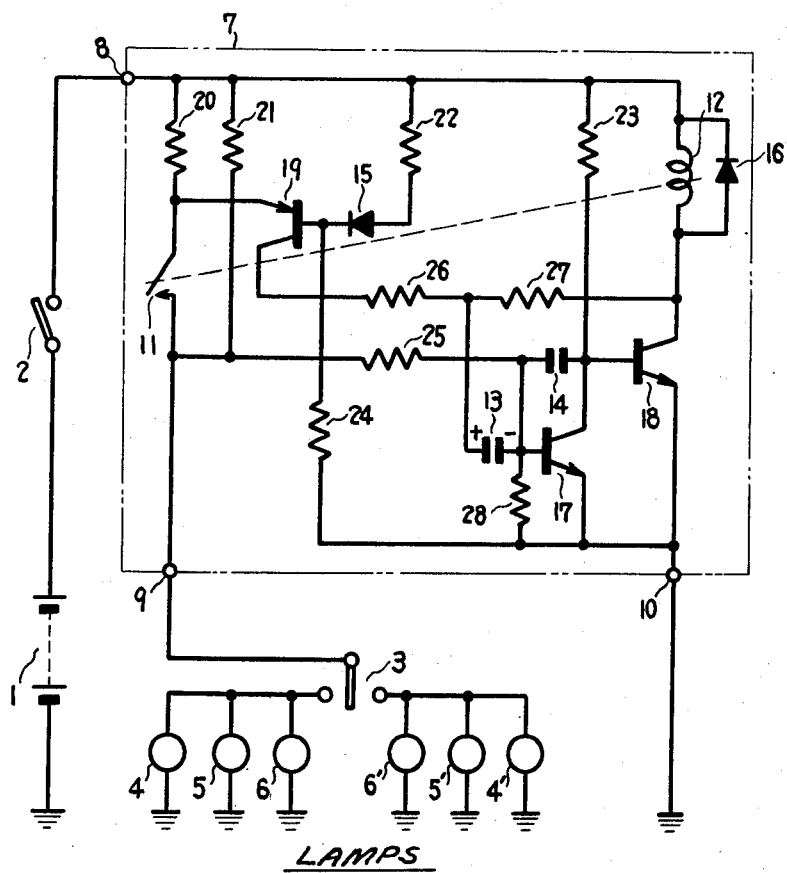
FIG. 1 is an electrical circuit diagram showing a first embodiment of the flasher apparatus for a vehicle according to the present invention.

Referring first to FIG. 1, numeral 1 designates a power supply, one end of which is connected to the ground. Numeral 2 designates a power switch, one end of which is connected to a non-grounded side of the power supply. Numeral 3 designates a direction indicator switch, numerals 4, 5, 4', and 5' designates right and left direction indicator lamps, and 6 and 6' designate direction indicator pilot lamps installed inside a instrument panel in a vehicle. One end of each of direction indicator lamps 4, 5, 4', and 5' and direction indicator pilot lamps 6, and 6' is connected to and the ground, the other end of each of them is connected in parallel to direction indicator switch 3. Numeral 7 designates a flash control circuit, details of which are as follows. Numeral 8 designates a power supply side terminal, which is connected through the power switch 2 to the non-grounded side of the power supply 1. Numeral 9 designates a load side terminal, which is connected through the direction indicator switch 3 to the direction indicator lamps 4, 5, 4', and 5' and to the direction indicator pilot lamps 6, and 6'. Numeral 10 designates a ground terminal. Numeral 11 designates a normally open switch, 12 a voltage coil which constitutes a relay circuit with normally open switch 11. Numeral 13 designates a charge-discharge capacitor, 14 a noise absorbing capacitor, 15 diode, 16 a diode for absorbing counter electromotive force generated across the voltage coil 12, 17 a first transistor, 18 a second transistor, and 19 a third transistor. The third transistor 19 operates as a flashing time control circuit with the charge-discharge capacitor 13, the first transistor 17, the second transistor 18 and the third transistor 19 to generate a switching output signal in accordance with the charge and discharge of the capacitor 13. 20 designates a voltage detection resistor, the resistance value of which is made relatively small for detecting load current. The voltage detection resistor 20 operates as a power supply circuit with the direction indicator switch 3 to supply power from the power supply 1 to the direction indicator lamps 4, 4', and 5, 5' and the direction indicator pilot lamps 6, and 6'. Each of the numerals 21, 22, 23, 24, 25, 26, 27, and 28 designates a resistor respectively.

With the construction described above, the flasher apparatus for a vehicle of this invention operates as follows. When the power switch 2 is closed, power supply voltage is applied to the collector of first transistor 17 through the power switch 2 in its closed state, the power supply side terminal 8 and the resistor 23. Simultaneously base current of the first transistor 17 is supplied thereto through the resistor 21, and resistor 25, whereby the first transistor 17 becomes conductive. Accordingly the electric potential applied to the base of the second transistor 18 becomes nearly ground potential, whereby the second transistor 18 remains non-conductive, though to the collector of the second transistor 18, power supply voltage is applied through the voltage coil 12. Accordingly, charge current for charging the charge-discharge capacitor 13 now flows from the power supply 1 through the voltage coil 12, the resistor 27, the charge-discharge capacitor 13, the base-emitter circuit of the first transistor 17 in its conductive state to ground. Moreover, to a base of the third transistor 19, a voltage which is lower than the power supply voltage by the forward drop voltage of the diode 15 is applied; power supply voltage, to an emitter of the third transistor 19 is also applied through the resistor 20. Base current of the third transistor 19 flows through the resistor 24 and the third transistor 19 becomes conductive. Charge current also flows through the resistor 20, the third transistor 19 in its conductive state and the resistor 26 into the charge-discharge capacitor 13, for charging the charge-discharge capacitor 13. When the charge-discharge capacitor 13 is fully charged, the third transistor 19 becomes non-conductive because of the increase of the collector potential of the third transistor 19. If a driver now turns the direction indicator switch 3, for instance, to the left position in FIG. 1, the load side terminal 9 will be as if connected to ground, since the internal resistances of the direction indicator lamps 4, and 5 and the direction indicator pilot lamp 6 are extremely small. Therefore, the base current for the first transistor 17 through the resistors 21, and 25 stops flowing, and the first transistor 17 becomes nonconductive.

Then the base current for the second transistor 18 begins to flow through the resistor 23, whereby the second transistor 18 which has been standing ready becomes conductive and the collector potential of the second transistor 18 becomes nearly equal to ground potential. Accordingly current flows from the power supply side terminal 8 through the voltage coil 12 and the second transistor 18 in conductive state, whereby the normally open switch 11 is closed by the magnetomotive force generated in the voltage coil 12. Therefore, the power voltage is applied to the direction indicator lamps 4, and 5 and the direction indicator pilot lamp 6 through the power switch 2 in closed state, the power supply side terminal 8, the voltage detection resistor 20, the normally open switch 11 in closed state, the load side terminal 9 and the direction indicator switch 3 in closed state, whereby the direction indicator lamps 4, and 5 and the direction indicator pilot lamp 6 are lit. At this time, since the electric potential of the plus side of the charge-discharge capacitor 13 falls to nearly ground potential through the resistor 27 and the second transistor 18 in conductive state, the electric potential of the minus side of the charge-discharge capacitor 13, namely the base potential of the first transistor 17, is less than the ground potential by the charging voltage across the charge-discharge capacitor 13. Therefore, the charge-discharge capacitor 13 begins discharging through a series circuit consisting of the resistor 27, the second transistor 18 in conductive state and the resistor 28. On the other hand, in this embodiment, the voltage drop of the resistor 22 and the forward voltage drop of the diode 15 is adjusted to be slightly smaller than or equal to the voltage potential across the voltage detection resistor caused by the load current therefore, the potential of the collector of the third transistor 19 is lower than or equal to the potential of the base of the third transistor 19 so that the third transistor 19 may remain non-conductive. When the minus side of the charge-discharge capacitor 13 reaches a the threshold voltage of the first transistor 17, while discharging, base current of the first transistor 17 flows through the normally open switch 11 in closed state and the resistor 25 so that the first transistor 17 may become conductive. Then the base potential of the second transistor 18 falls neaarly to the ground potential and the second transistor 18 becomes non-conductive. Coil current flowing through the voltage coil 12 stops flowing therethrough, whereby the magnetic force disappears, and the normally open switch 11 in closed state returns to its open state. Consequently the left direction indicator lamps 4, and 5 and the left direction indicator pilot lamp 6 are extinguished. Then power supply voltage is applied to the emitter of the third transistor 19. Since a voltage which is lower than the power supply voltage by the forward voltage drop of the diode 15 is applied to the base of the third transistor 19, base current of the third transistor 19 flows through the resistor 24, whereby the third transistor 19 becomes conductive, as mentioned before. Accordingly charge current for the charge-discharge capacitor 13, namely the base current of the first transistor 17, flows through the resistor 26, the charge-discharge capacitor 13, the base of the first transistor 17 and to the emitter of the first transistor 17, whereby the first transistor 17 and the second transistor 18 are kept conductive and non-conductive respectively. Further, base current of the first transistor 17 is also supplied through the voltage coil 12 and the resistor 27. This base current flows until the charge-discharge capacitor 13 is fully charged, because the charge current for the charge-discharge capacitor 13, namely the base current of the first transistor 17 stops and further, one end of the resistor 25 is grounded through the direction indicator lamps 4, and 5 and the direction indicator pilot lamp 6, the resistance values of which are small. Thus the first transistor 17 becomes non-conductive. Then the second transistor 18 becomes conductive, because the base current thereto is applied through the resistor 23. Accordingly the coil current in the voltage coil 12 flows through the second transistor 18 in conductive state, whereby the normally open switch 11 is closed by the magnetomotive force generated by the voltage coil 12. Consequently the direction indicator lamps 4, and 5 and the direction indicator pilot lamp 6 are lit again. The flashing cycle of the lamps is repeated, based on the same operation described above.

When a driver sets the direction indicator switch 3 to the left position in FIG. 1, if the direction indicator lamp 4 has burned out, the normally open switch 11 closes as described above. Then the current flows from the power supply 1 to the direction indicator lamp 5 and the direction indicator pilot lamp 6, which are both normal, through the power switch 2, the power supply side terminal 8, voltage detection resistor 20, the normally open switch 11 in closed state, the load side terminal 9 and the direction indicator switch 3 in closed state. Therefore both of the direction indicator lamps 5 and the direction indicator pilot lamp 6 are lit. If all of the lamps were normal, the third transistor 19 would have been in its non-conductive state for the reason described before. But at this time, since the direction indicator lamp 4 is open, namely burn out, the amount of load current flowing through the voltage detection resistor 20 diminishes to a considerably low value, for example about half, compared with when all of the lamps are normal. Consequently the potential generated across the voltage detection resistor 20 is small. As the result, the emitter potential of the third transistor 19 becomes larger than the base potential of the same transistor, and the base current flows to the transitor 19 through the resistor 24 so that the third transistor 19 may be conductive. Accordingly, the collector current of the third transistor 19 flows through the voltage detection resistor 20, the third transistor 19 in conductive state, resistors 26, and 27 and the second transistor 18 in conductive state to ground, causing a voltage drop across the resistor 27 and the voltage drop between the collector and the emitter of the second transistor 18. Since the sum of the voltage drop across the resistor 27 and the voltage drop between the collector and the emitter of the second transistor 18 are applied to the plus side of the charge-discharge capacitor 13, the fully charged capacitor 13 is discharged until the remaining charge thereof is enough to equal the equivalent sum of the voltage drop across the resistor 27 and the voltage drop between the collector and the emitter of the second transistor 18. Then the base current of the first transistor 17 flows through the normally open switch 11 in closed state and the resistor 25 so that the first transistor 17 becomes conductive. Since the base potential of the second transistor 18 falls nearly to ground potential, the base current to the second transistor 18 stops flowing. Therefore the second transistor 18 becomes non-conductive, the coil current flowing through the voltage coil 12 stops flowing, and the normally open switch 11 is opened, whereby the direction indicator pilot lamps 6 are extinguished. In this case, the lighting duration of the direction indicator lamp 5 and the direction indicator pilot lamp 6 is decided by the discharging time period of the capacitor 13. This lighting duration is shorter compared with the case that all the lamps 4, 5 and 6 are on normal condition, because the charge stored in the capacitor was not fully discharged due to the conduction of the transistor 19. Then charge current to the charge-discharge capacitor 13, in other words, base current to the first transistor 17, flows not only through the third transistor 19 but also through the circuit of the voltage coil 12 and the resistor 27, whereby the first transistor 17 keeps conductive and the second transistor 18 keeps non-conductive state. In this case the time period needed for fully charging the charge-discharge capacitor 13 becomes shorter than the time period when all of the lamps are normal, since the discharge of the charge-discharge capacitor 13 is stoped, retaining some electric charge on the charge-discharge capacitor 13 as described above.

Figure 2:
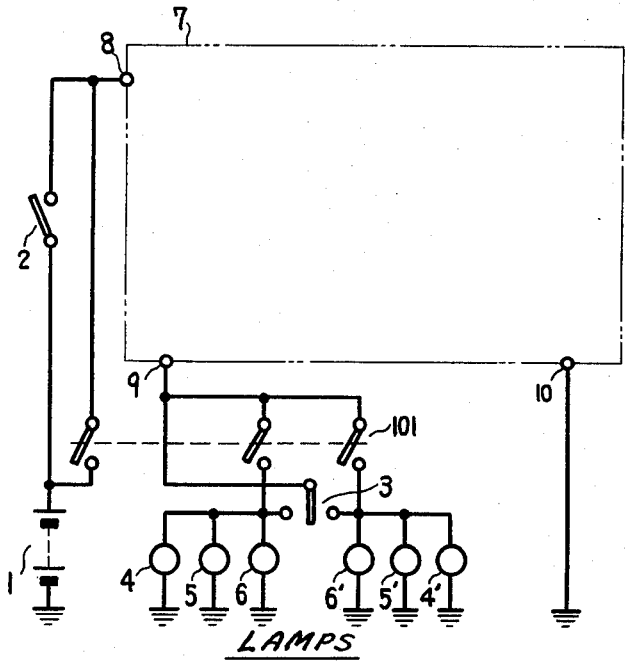
FIG. 2 is an electrical circuit diagram showing a second embodiment of the flasher apparatus for a vehicle according to the present invention.

To summarize, when one or more of the lamps burns out, both of the time intervals when remaining normal lamps are lit on and off become shorter in comparison with when all lamps are in normal condition. In other words, the flashing cycle of the lamps become shorter. Referring to FIG. 2 illustrating a second embodiment of the present invention, numeral 7 designates a flash control circuit which are is the same as described in FIG. 1. Numeral 101 designates a emergency indicator switch of linkage type which serves to make three circuits, the first one connecting the power supply 1 and the power supply side terminal 8, the second connecting the load side terminal 9 and the left direction indicator lamps 4, and 5 and the left direction indicator pilot lamp 6, and the third connecting the load side terminal 9 and the right direction indicator lamps 4', 5' and the right direction indicator pilot lamp 6'.

With the construction described above, a flasher apparatus for a vehicle of this invention operates as follows. When a driver turns on the emergency indicator switch 101 to inform the emergency of the car to people outside, the power is supplied to the power supply side terminal 8 even if the power switch 2 is not closed. Furthermore the power is supplied to the right and left direction indicator lamps 4, 5, 4', 5' and the direction indicator pilot lamps 6, 6' from the load side terminal 9 through the closed emergency indicator switch 101.

The amount of load current flowing through the voltage detection resistor 20 is about twice as large as that of load current used for one side of the direction indicators, so the voltage drop across the voltage detection resistor 20 becomes larger, and the third transistor 19 remains non-conductive when the capacitor 13 is discharged as mentioned before since the emitter potential of the third transistor 19 becomes lower than the base potential of the third transistor 19. Consequently the flashing cycle of the lamps is not shortened as much as when one of the lamps burns out. In such a manner, the present invention can be used not only for a direction indicating flasher apparatus but also for an emergency indicating flasher apparatus.

Figure 3:
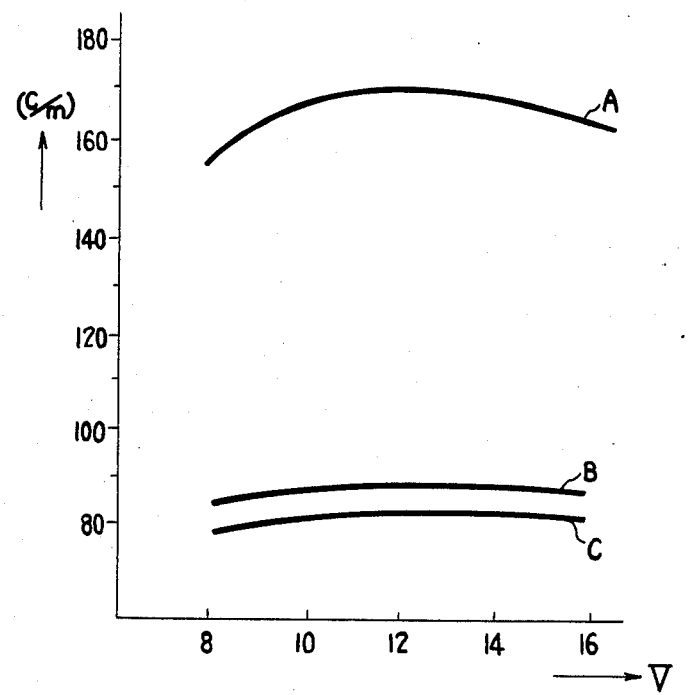
FIG. 3 is a diagram representing the characteristic of each flasher apparatus shown in FIG. 1 and FIG. 2.

FIG. 3 is a diagram representing the characteristic curve of flasher apparatus for a vehicle according to the present invention employing the following circuit constants. The charge-discharge capacitor 13 consists of a 47μF 16V electrolytic capacitor, the noise absorbing capacitor 14 of a 0.05μF 50V capacitor, the diode 15, and 16 of silicon diodes respectively, the first and the second transistors 17, and 18 of a NPN type silicon transistor respectively, the voltage detection resistor 20 of a 0.05Ω 2W resistor. The resistance values of the resistors 21, and 23 are respectively 1kΩ, the resistor 22 of 10Ω, the resistor 24 of 1.5kΩ, the resistor 25 of 8.2kΩ, the resistor 26 of 1.8kΩ, the resistor 27 of 3kΩ, and the resistor 28 of 2.7kΩ. In FIG. 3, the ordinate represents the flashing number of the lamps per minute, the abscissa represents the power supply voltage, A represents the flashing characteristics of the direction indicator when one lamp burns out, B shows the flashing characteristics of the direction indicator when all lamps are normal, and C shows the flashing characteristics of the emergency indicating flasher apparatus. Referring to FIG. 3, it can be easily understood that the vehicle flasher apparatus of the present invention has stable and distinguishable characteristics even though the power supply voltage is changeable from the setting value.

While the invention has been shown and described in this specification, it is recognized that departures may be made therefrom within the scope of the invention, which is not to be limited to the details disclosed, but is to be accorded to the full scope of the claims so as to include all equivalent devices.

What is claimed is:
1. A flasher apparatus for a vehicle comprising,
a power supply,
a plurality of lamps, each of said lamps being connected in parallel,
a power supply circuit including a voltage detection resistor means and an on-off switch, for supplying power from said power supply to each of said lamps through said voltage detection resistor means and said on-off switch, when said on-off switch is closed,
a drive circuit connected to said on-off switch for opening and closing said on-off switch,
a charge-discharge capacitor,
a charging circuit connected to said power supply and said charge-discharge capacitor,
a discharging circuit, connected to said charge-discharge capacitor and said drive circuit, for producing an output signal for driving said drive circuit,
a voltage supply circuit connected to said voltage detection resistor means and said discharging circuit for applying a predetermined voltage to said charge-discharge capacitor when the voltage drop of said voltage detection resistor means attains a threshold voltage owing to at least one of said plurality of lamps burning out, thereby to reduce the charging and discharging time of the charge-discharge capacitor so that the flashing cycle of the lamps not burned out can become faster than the flashing cycle when none of said plurality of lamps is burned out,
wherein said discharging circuit comprises,
a first transistor, the base thereof is connected to one side of said charge-discharge capacitor, and the emitter thereof is connected to the ground, a second transistor, the base thereof is connected to the collector of said first transistor, the emitter thereof is connected to the ground, and the collector thereof is connected to the other side of said charge-discharge capacitor through a resistor and also connected to said drive circuit, and wherein said charging circuit and said voltage supply circuit comprise, a third transistor, the emitter thereof is connected to the load side of said voltage detection resistor means, the base thereof is connected to said power supply through a series circuit of a diode and a resistor and also connected to the ground through a resistor, and the collector thereof is connected through a resistor to the junction of said charge-discharge capacitor and said resistor which is connected between said charge-discharge capacitor and said collector of said second transistor.

2. A flasher apparatus for a vehicle as claimed in claim 1, wherein said drive circuit comprises an electromagnetic relay connected to said collector of said second transistor for driving when energized, said on-off switch.

3. A flasher apparatus for a vehicle comprising, a power supply, a plurality of lamps, each of said lamps being connected in parallel, a power supply circuit including a voltage detection resistor means and an on-off switch, for supplying power from said power supply to each of said lamps through said voltage detection resistor means and said on-off switch, when said on-off switch is closed, a drive circuit connected to said on-off switch for opening and closing said on-off switch, a charge-discharge capacitor, a charging circuit connected to said power supply and said charge-discharge capacitor, a discharging circuit, connected to said charge-discharge capacitor and said drive circuit, for producing an output signal for driving said drive circuit, a voltage supply circuit connected to said voltage detection resistor means and said discharging circuit for applying a predetermined voltage to said charge-discharge capacitor when the voltage drop of said voltage detection resistor means attains to a threshold voltage owing to at least one of said plurality of lamps burning out, thereby to reduce the charging and discharging time of the charge-discharge capacitor so that the flashing cycle of the lamps not burned out can become faster than the flashing cycle when none of said plurality of lamps is burned out, wherein said charging circuit and said voltage supply circuit comprise, a transistor, the emitter thereof is connected to the load side of said voltage detection resistor means, the base thereof is connected to said power supply through a series circuit of a diode and a resistor and also connected to ground through a resistor, and the collector thereof is connected to said charge-discharge capacitor through a resistor.

4. A flasher apparatus for a vehicle as claimed in claim 3, wherein said drive circuit comprises an electromagnetic relay for driving, when energized, said on-off switch.

5. A flasher apparatus for a vehicle comprising, a power supply, a plurality of lamps, each of said lamps being connected in parallel, a power supply circuit including a voltage detection resistor means and an on-off switch, for supplying power from said power supply to each of said lamps through said voltage detection resistor means and said on-off switch, if said on-off switch is closed, a flashing time control circuit connected to said voltage detection resistor means for detecting the voltage drop due to said voltage detection resistor means and generating an output signal, the duration of said output signal being a function of the value of said voltage drop, and a drive circuit connected to said flashing time control circuit and said on-off switch for closing said on-off switch only during said duration of the output signal produced from said flashing time control circuit, wherein said flashing time control circuit comprises, a charge-discharge capacitor, a first transistor, the base thereof is connected to one side of said charge-discharge capacitor, and the emitter thereof is connected to ground, a second transistor, the base thereof is connected to the collector of said first transistor, the emitter thereof is connected to ground, and the collector thereof is connected to the other side of said charge-discharge capacitor through a resistor and also connected to said drive circuit, and a third transistor, the emitter thereof is connected to the load side of said voltage detection resistor means, the base thereof is connected to said power supply through a series circuit of a diode and a resistor and also connected to ground through a resistor, and the collector thereof is connected through a resistor which is connected between said charge-discharge capacitor and said resistor which is connected between said charge-discharge capacitor and said collector of said second transistor.

6. A flasher apparatus for a vehicle as claimed in claim 5 further comprises, another set of plurality of lamps, each of said lamps being connected in parallel, a power switch inserted to said power supply circuit for interrupting power from said power supply, a direction indicator switch inserted to said power supply circuit for selecting either one of said two sets of plurality of lamps for flashing operation, a breakage indicator switch for supplying power from said power supply to all of said lamps when closed, by short-circuiting both ends of said power switch and both ends of said breakage indicator switch simultaneously.

7. A flasher apparatus for a vehicle as claimed in claim 1, wherein said drive circuit comprises an electromagnetic relay connected to said collector of said second transistor for driving when energized said on-off switch.

* * * * *